Sept. 10, 1968    R. W. GOODE    3,400,900
DUAL TENSIONER PHASE AND BRAKE CONTROL
Filed June 21, 1966
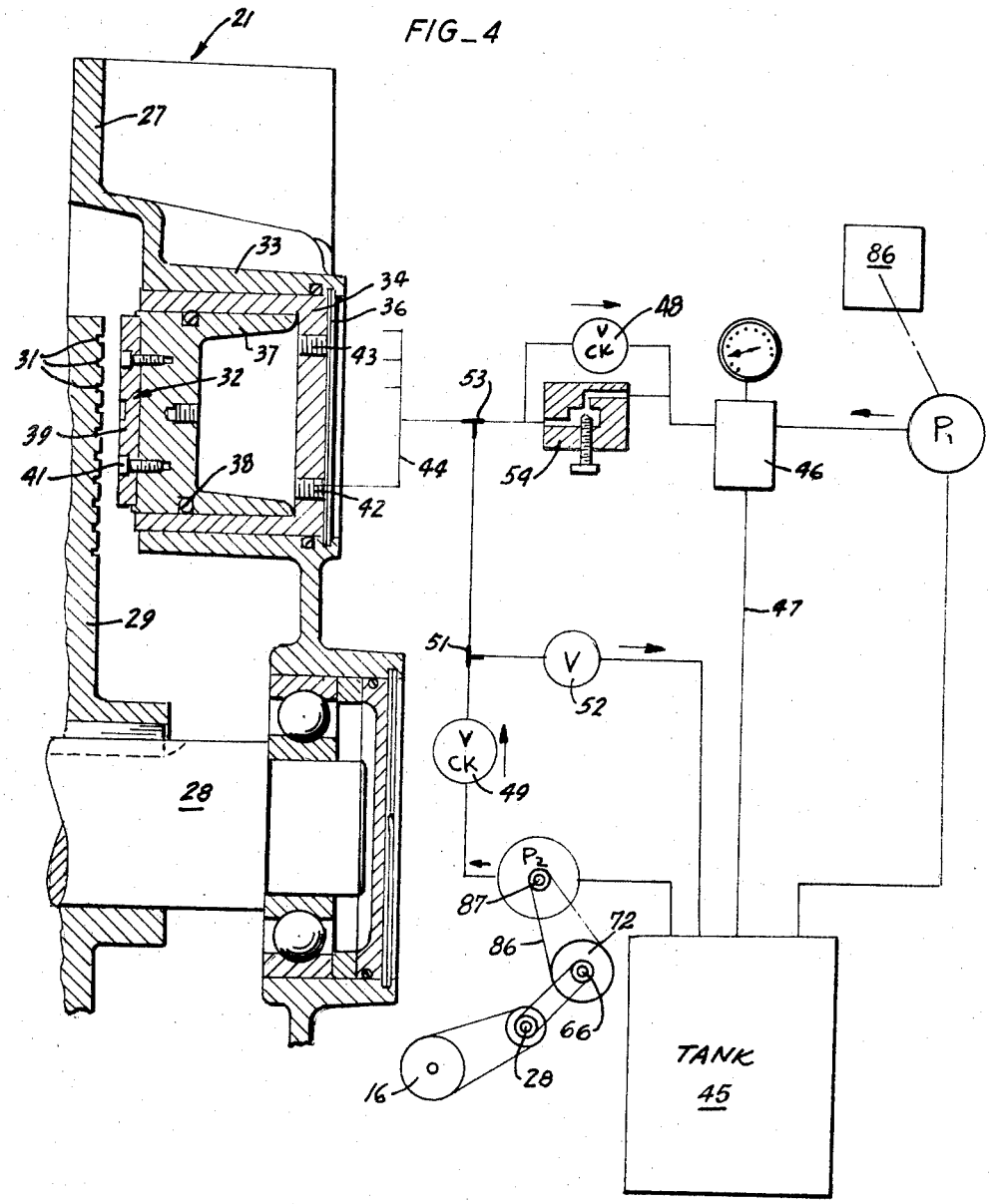
FIG_4
INVENTOR.
ROBERT W. GOODE
BY Julian Caplan
ATTORNEY

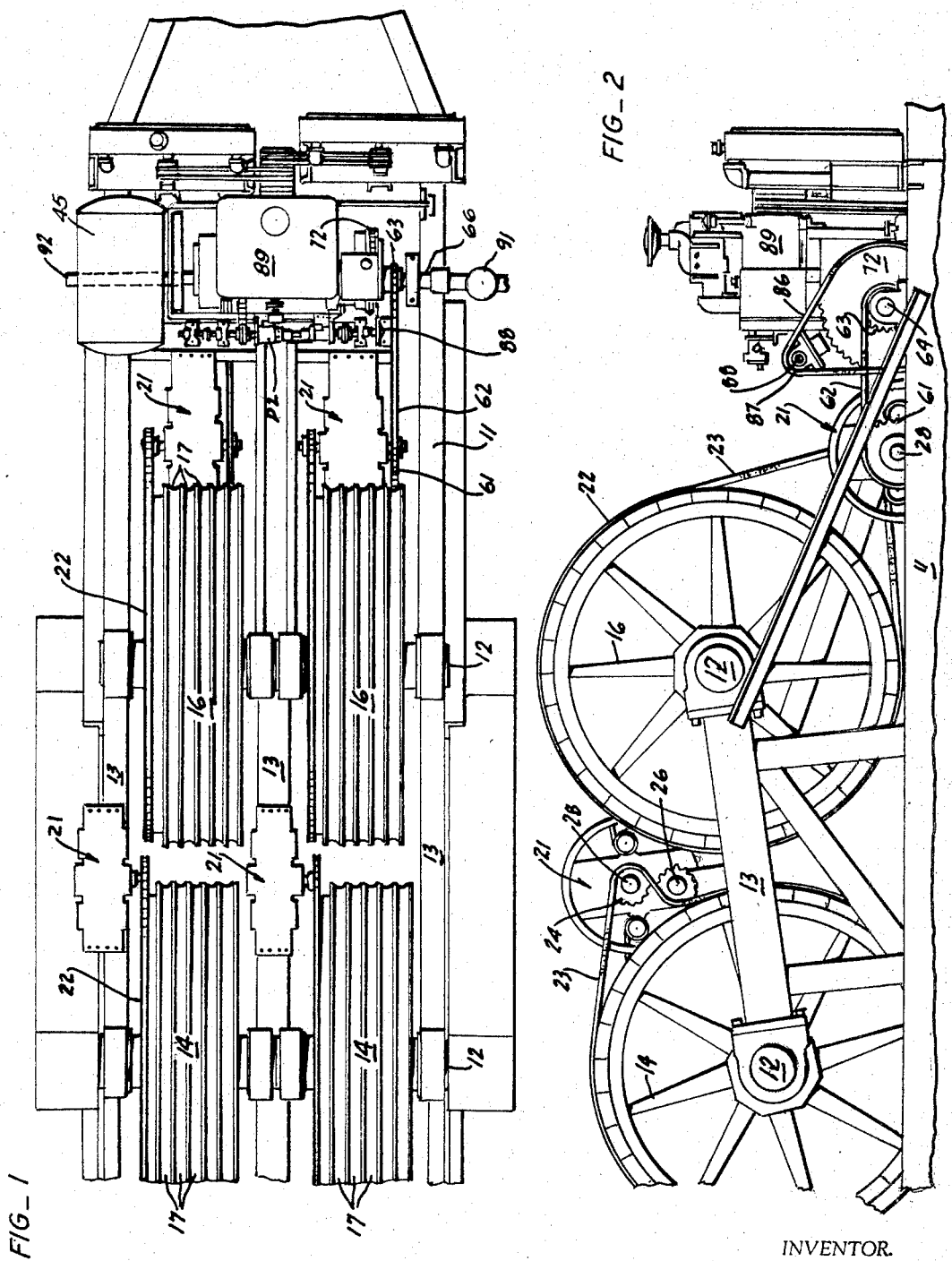

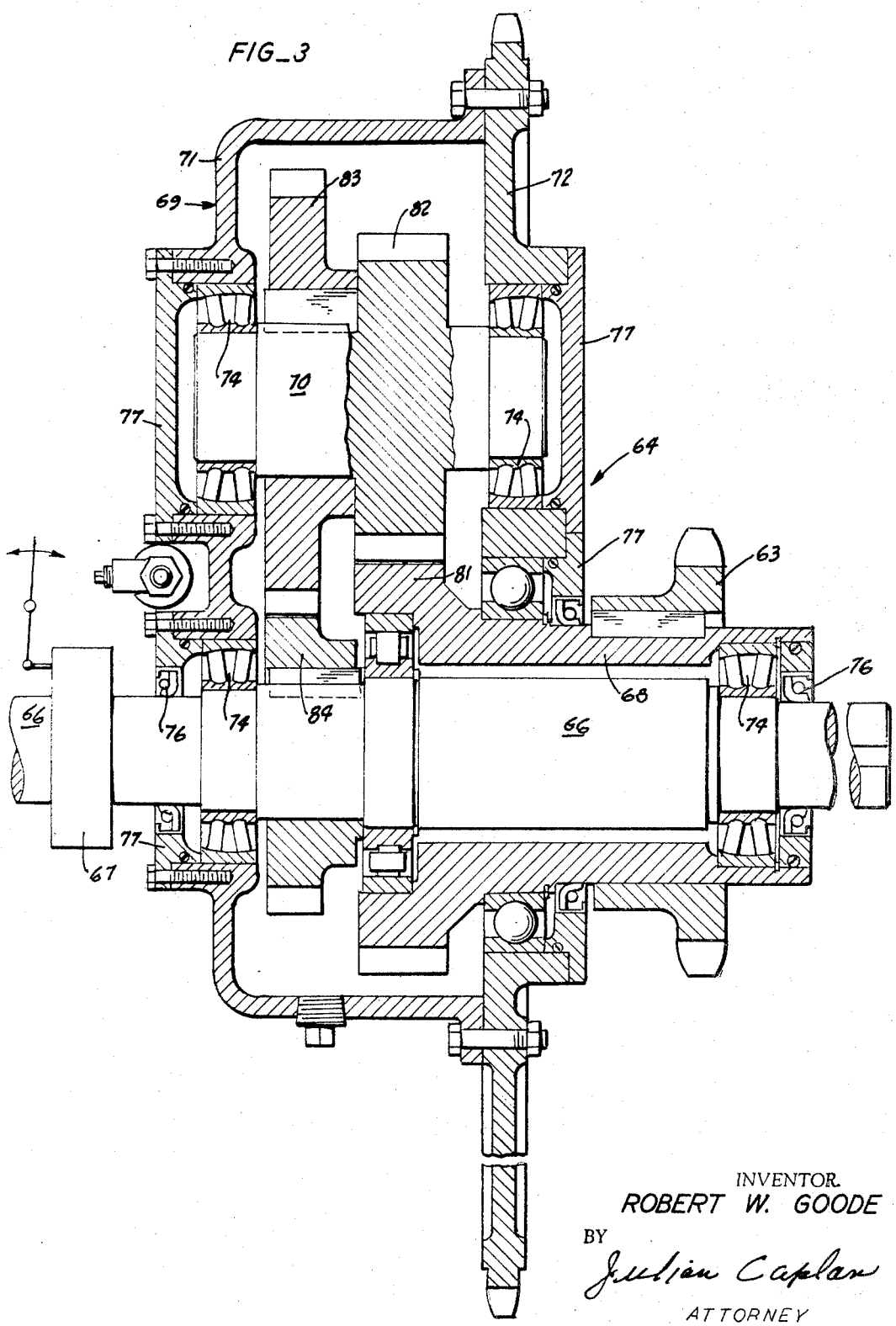

United States Patent Office 3,400,900
Patented Sept. 10, 1968

3,400,900
DUAL TENSIONER PHASE AND BRAKE CONTROL
Robert W. Goode, Morgan Hill, Calif., assignor to Gerald A. Petersen, Sunnyvale, Calif.
Filed June 21, 1966, Ser. No. 559,255
8 Claims. (Cl. 242—155)

ABSTRACT OF THE DISCLOSURE

Tension stringing equipment for stringing multiple conductors each over an individual set of bull wheels has phase control to maintain equal slack on each conductor. Further, a braking system for the bull wheels is provided wherein two separate pumps for brake fluid are provided, one driven by a prime mover and the other from a bull wheel. The output of the two pumps is combined and controlled so that a uniform braking force is applied to the brake disk substantially continuously.

---

This invention relates to a new and improved dual tensioner phase and brake control. More particularly the invention is characterized by the provision of a machine for stringing two or more conductor cables simultaneously or may be adapted for use with a single conductor.

Tension stringing of electrical conductors provides machines whereby overhead lines are strung while the conductors are maintained in the air at all times to avoid damage. Ordinarily, a pulling line of wire rope is attached to the lead end of the conductor, the rope being run through stringing sheaves attached to the crossarms of poles or towers. Any damage which may occur by reason of contact with the ground or other obstructions is absorbed by the pulling rope. In the course of the operation, a tension puller machine is attached at one end of the line and a tension braking machine at the opposite end. Each of these machines is provided with a pair of bull wheels for each conductor. The bull wheels of the puller are equipped with power for turning with a force greater than the braking action at the other end of the line. If the equipment is properly operated, the conductor never touches the ground at any time during the stringing operation. Thus, damage to the conductor is avoided and this is of importance in that damage results in corona loss and also sets up radio interference when the conductor transmits high voltage. Furthermore, the use of tension stringing avoids obstructions, such as pre-existing power and telephone lines, roads, streets and railroad tracks which must be traversed by the line being strung. The present invention differs from previous tensioners in one respect in that it is intended for use primarily where two or more conductors are strung simultaneously.

In accordance with conventional practice, when the machine is used for stringing two lines, the lines are directed from their reels around the bull wheels of the tensioner and thence through a plurality of sheaves on the crossarms on the poles and thence to the tension puller, which is power driven. The bull wheels of the tensioner are connected to brake disks to which a braking force is applied, which insures that the pulling line and also the conductor, to which the trailing end of the pulling line is attached, is maintained at predetermined tension.

One of the features and advantages of the present invention is the provision of phase control. It will be understood that ordinarily one of the conductors at any given instant may tend to lag behind the other by reason of operating conditions. The present invention provides a new and improved means for controlling the phase of the two conductors to maintain an equal amount of slack on each of two or more lines.

A further feature of the invention relates to the braking system. Hydraulically operated brake shoes engage a brake disk associated with each bull wheel. The present invention employs two separate pumps for hydraulic fluid, one pump driven by at least one bull wheel and the other by a prime mover. The output of the two pumps is combined and its pressure is controlled by manual adjustment of a valve so that a braking force of uniform amount is applied to the brake disk substantially continuously. Thus, at the beginning of turning of the bull wheels, the braking force is less than when the bull wheels are turning at normal operating speed. When the bull wheels are turning, a braking force is applied which tends to achieve uniform speed of the conductor.

Other objects of the present invention will become apparent upon reading the following specification and referring to the accompanying drawings in which similar characters of reference represent corresponding parts in each of the several views.

In the drawings:

FIG. 1 is a top plan view of a machine in accordance with the present invention broken away to conserve space and with certain parts thereof omitted.

FIG. 2 is a side elevation of a structure of FIG. 1.

FIG. 3 is an enlarged, transverse sectional view through the phase control mechanism.

FIG. 4 is a schematic view of the braking system showing in fragmentary section a portion of one of the brakes.

The present invention provides a tensioner which is mounted on a trailer frame 11 supported by ground wheels (not shown). It is assumed that two reels of pulling lines such as wire rope or conductors are unwound from their reels (not shown, but located to the left of FIG. 1) through the tensioner and thence directly outwardly to the first sheave (not shown) of the first pole or tower. The machine applies a braking force to the two conductors or pulling lines but it will be understood that more than two conductors may be tensioned by expanding the machine in a manner which will readily occur to one skilled in the art. Furthermore, a pair of machines may be positioned side by side and interconnected as hereinafter explained. Further, where it is desired to use the equipment for a single conductor, a portion of the equipment may be disconnected and held inoperative. It will be further understood that at a remote location there is a tension puller which pulls in the pulling lines or conductors under power.

Rotatably mounted on transverse horizontal shafts 12 journaled in frame members 13 of frame 11 are front and rear bull wheels 14 and 16 rotatably mounted on their respective shafts 12. Each wheel 14 or 16 is formed with a plurality of grooves 17, the grooves of each pair of wheels being staggered an increment equal to half the spacing between grooves. The bull wheels are not keyed or otherwise fixed to their shafts and hence although the two parallel wheels 14, 14 or 16, 16 generally turn synchronously, it is not essential that they so turn.

Associated with each bull wheel 14, 16 is a brake 21. Thus, a large diameter sprocket 22 is fixed to each bull wheel and through chain 23 drives sprocket 24 of brake 21. A tightener sprocket 26 also engages chain 23. Brake 21 has an enlarged casing 27 partially shown in FIG. 4 in which shaft 28 is rotatably mounted. Keyed to shaft 28 is a suitably cooled brake disk 29 having a scroll groove 31 formed therein. A plurality of brake shoes 32 is arranged to engage disk 29. In a preferred form of the invention, four such shoes 32 are employed, two on each side of the disk. To accommodate each shoe 32 an annular boss 33 is formed in casing 27 to receive cup-shaped cylinder 34 which is retained in boss 33 by retaining snap ring 36. Slidable within cylinder 34 is piston 37 which is likewise cup shaped and is provided with piston ring 38 to effect a tight sliding seal. A brake surfacing material 39 such as asbestos may be applied to the working end of the piston 37 and held in place by screws 41. Two ports 42, 43 are provided for each cylinder, lower port 42 being connected to hydraulic line 44 and the upper port 43 being plugged but used for bleeding purposes.

The hydraulic system for each brake shoe 32 is also shown schematically in FIG. 4. Pump P1 is driven by a prime mover such as engine (not shown). Pump P2 is driven by one of the bull wheels by intermediate means shown in FIG. 4. Thus pump P1 delivers continuously and pump P2 intermittently and proportional to speed of rotation of the bull wheel. Hydraulic fluid is drawn by each pump from a common tank 45. Pump P1 discharges fluid under pressure to a pressure regulator 46, which is normally set above the pressure in the system. Excess fluid is returned from pressure regulator 46 through pipe 47 when the selected pressure is exceeded. Fluid under preselected pressure continues from pressure regulator 46 through needle valve 54 (which restricts the volume of flow from pump P1), and thence to brake fluid line 44 which branches out to the inlet port 42 of each of the four brake cylinders to maintain each cylinder under braking pressure. Check valve 48 permits reverse flow to by-pass valve 54. Pump P2 draws fluid from the tank and thence through check valve 49 and the discharge from check valve 49 reaches T 51 which leads to a manually controlled valve 52 leading back to the tank. Another branch of T 51 is connected through T 53 to line 44 from pump P1.

When bull wheel 14, 16 is not turning or is turning very slowly, the principal braking force applied is derived from engine-driven pump P1 and thus a static braking force is applied to the bull wheels even when they are not turning. When the bull wheel is turning the delivery of pump P2 is proportional to the speed of rotation of the bull wheel and thus the variation in brake pressure tends to smooth out such speed variations. Valve 52 may be manually adjusted by the operator to transmit to brake 32 a pressure which is below the pressure of regulator 46 and which is the combined output of pump P1 and P2 sufficient to brake the bull wheels so that they do not exceed a preselected rate of rotation. When the pressure of pump P2 becomes excessive, by-pass valve 48 relieves the pressure.

The shaft 28 of each rear brake 21 has a sprocket 61 connected by chain 62 to sprocket 63. Phase control mechanism 64, shown in detail in FIG. 3, comprises horizontal transverse shaft 66 which is normally directly coupled to shaft 66 of the adjacent phase control 64 through clutch 67. Surrounding a portion of shaft 66 is sleeve 68 to which sprocket 63 is keyed. A casing 69 is provided for the phase control system consisting of several parts. At the left end, as viewed in FIG. 3, is a bell-shaped member 71 disposed eccentric to shaft 66. The open end of bell 71 is partially closed by an annular sprocket 72 and openings. Various bearings 74 and oil seals 76 are provided in and around casing 69 and openings are formed therein for access to the various shafts and bearings, said openings being closed by covers 77. Countershaft 70 parallel to shaft 66 is rotatably mounted in casing 69. Sleeve 68 is provided with a gear 81 which meshes with composite gears 82 and 83 on countershaft 70. The composite gear 83 meshes with gear 94 keyed to shaft 66. A one-to-two ratio gear is provided by reason of the respective diameters of gears 81 and 84.

Each of the phase control mechanisms 64 heretofore described is connected through shaft 66 to at least one adjacent similar mechanism. Thus variations in rate of unwinding of the conductors is achieved. In order to prevent sagging of one conductor relative to the other, sprocket 72 is connected by chain 86 to sprocket 87 on shaft 88 which extends horizontally transversely of frame 11. Shaft 88 is driven by a prime mover 89 mounted on frame 11 by means of a manually controlled clutch (not shown).

Accordingly, the pairs of bull wheels 14, 16 can be brought into phase synchronism by engaging and disengaging the clutch (not shown) to turn the casing 69 of the lagging or leading phase control mechnisms.

As has been stated, a pair of frames 11 may be positioned side by side. Shaft 64 extends outward at either end. One end of each shaft may be connected by universal joint connection 91 or other suitable means to the end 92 of the adjacent shaft 64.

In operation, when the bull wheels are stationary, pump P1 delivers a uniform braking force, as manually controlled by valve 54. When the conductors are pulled, the discharge of pump P2 is combined with P1 so that the wheels do not exceed a preselected rate of rotation. The braking force is less at low speed and increases as speed increases because pump P2 discharges at a rate proportional to speed.

Normally both conductors move at the same speed but occasionally they tend to get out of phase. When this occurs, one of the casing 69 may be turned relative to its shaft by means of prime mover 89 until the conductors are in phase.

Although the foregoing invention has been described in some detail, by way of illustration and example for purposes of clarity and understanding, it is understood that certain changes and modifications may be practiced within the spirit of the invention and scope of the appended claims.

What is claimed is:

1. In a tensioning machine, a frame, a first set of bull wheels, means mounting said first set for rotation on said frame, a second set of bull wheels, means mounting said second set for rotation on said frame independent of said first set, brake means for braking said bull wheels, a shaft, a first and a second casing each rotatably mounted on said shaft, a first and a second sleeve rotatable about said shaft and extending partially into said first and second casings, respectively, first and second transmission means for rotating said first and second sleeves with one of said first and second sets of bull wheels, respectively, a first gear train in said first casing interconnecting said first sleeve and said shaft, a second gear train in said second casing interconnecting said second sleeve and said shaft, and third transmission means for turning said first casing about said shaft to change the phase of said first sleeve relative to said shaft, and a prime mover driving said third transmission means.

2. A machine according to claim 1 in which said shaft is formed in two parts interconnected by a clutch, each said part receiving one said casing and one said sleeve.

3. A machine according to claim 1 in which each said gear train has a gear reduction ratio.

4. A machine according to claim 1 in which said shaft has extensions to either side of said frame for interconnection to the shaft of an adjacent similar tensioner.

5. The combination of claim 1 in which said braking means comprises a shaft interconnected to one said bull wheel, a brake disk on said shaft, a casing around said disk, at least one brake shoe mounted in said casing and movable into and out of engagement with said disk, and a hydraulic system controlling movement of said shoe, said system comprising a first pump, a prime mover driving said first pump, a second pump, means driving said second pump from said bull wheel, a reservoir connected to the intake of each said pump, an adjustable pressure regulator connected to the discharge of said first pump and having a return to said reservoir operable to return fluid when the pressure at said regulator exceeds an adjusted amount, a restrictor valve normally restricting flow from said pressure regulator to said brake shoe, a check valve normally permitting flow from the discharge of said second pump to said brake shoe, a return line intermediate said check valve and said restrictor valve back to said reservoir and an adjustable valve in said return line.

6. The combination of claim 5 which further comprises a by-pass second check valve around said restrictor valve back to said pressure regulator.

7. A brake system for a tensioner comprising a bull wheel, a shaft connected to said bull wheel, a brake disk on said shaft, a casing around said disk, at least one brake shoe mounted in said casing and movable into and out of engagement with said disk, and a hydraulic system controlling movement of said shoe, said system comprising a first pump, a prime mover driving said first pump, a second pump, means driving said second pump from said bull wheel, a reservoir connected to the intake of each said pump, an adjustable pressure regulator connected to the discharge of said first pump and having a return to said reservoir operable to return fluid when the pressure at said regulator exceeds an adjusted amount, a restrictor valve normally restricting flow from said pressure regulator to said brake shoe, a check valve normally permitting flow from the discharge of said second pump to said brake shoe, a return line intermediate said check valve and said restrictor valve back to said reservoir and an adjustable valve in said return line.

8. A system according to claim 7 which further comprises a by-pass second check valve around said restrictor valve back to said pressure regulator.

References Cited

UNITED STATES PATENTS

| | | |
|---|---|---|
| 2,948,483 | 8/1960 | Petersen. |
| 3,037,720 | 6/1962 | Leithiser _____ 242—155 |
| 3,232,558 | 2/1966 | Barkley et al. _____ 242—155 |
| 3,241,817 | 3/1966 | Goode _____ 242—155 |

FOREIGN PATENTS

| | | |
|---|---|---|
| 868,968 | 5/1961 | Great Britain. |

STANLEY N. GILREATH, *Primary Examiner.*